Dec. 7, 1948.                D. E. DUNLOP                 2,455,660
                           COFFEE PERCOLATOR
                          Filed April 2, 1946
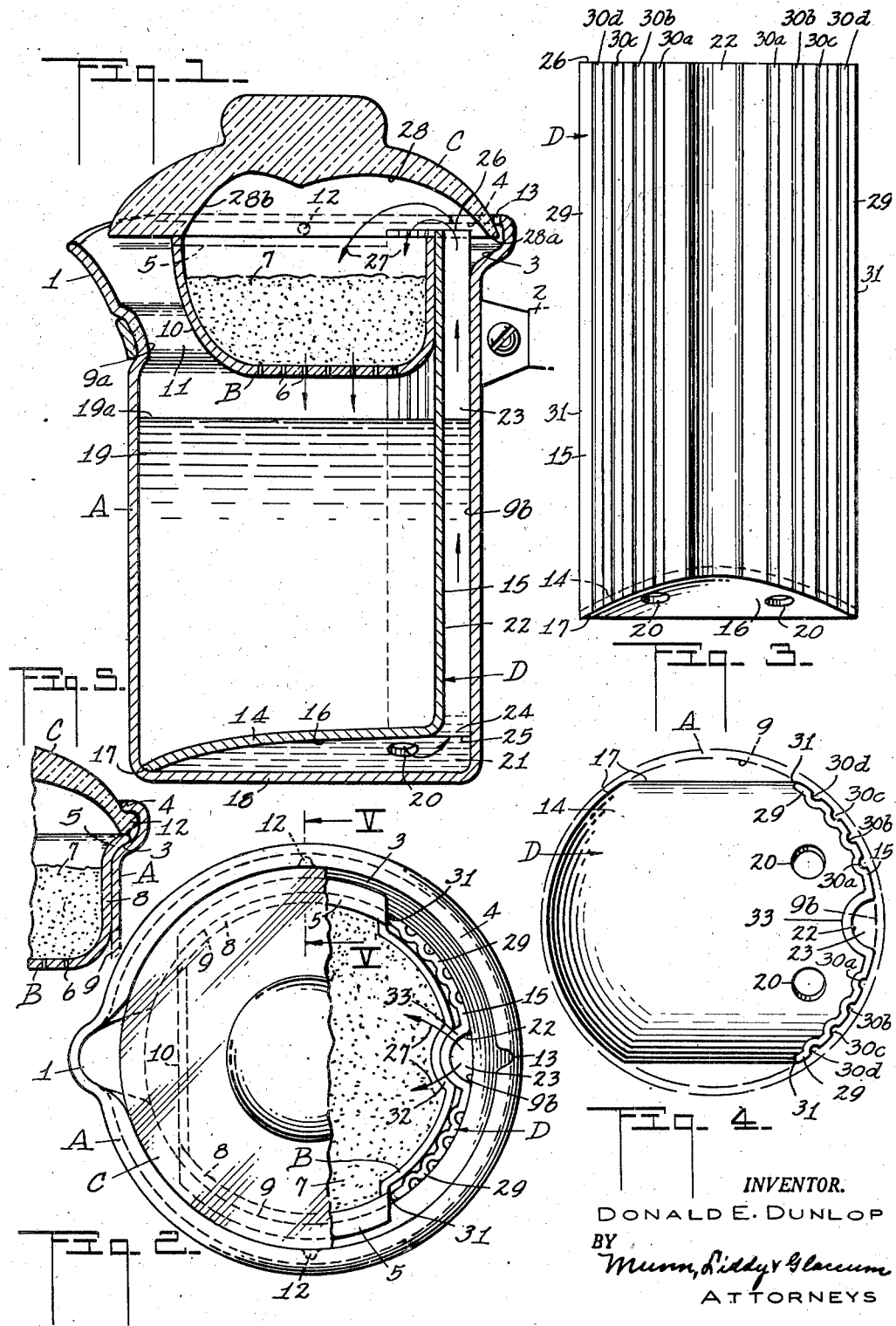
INVENTOR.
DONALD E. DUNLOP
BY
Munn, Liddy & Glaccum
ATTORNEYS Patented Dec. 7, 1948

2,455,660

UNITED STATES PATENT OFFICE 2,455,660

COFFEE PERCOLATOR

Donald E. Dunlop, San Pedro, Calif.

Application April 2, 1946, Serial No. 659,116

2 Claims. (Cl. 99—308)

My invention has to do with coffee percolators of the continuous-circulating type, and consists in certain novel constructions and arrangements hereinafter described and claimed.

An object of my invention is to provide a means of continuously circulating the water in a coffee percolator of the aforesaid type, without the use of a conventional pipe to conduct the water from beneath the base plate of the percolator to the inner percolating receptacle. As such a pipe easily becomes stained on the inside with a deposit of rancid oils and other matter, and is inconvenient to clean, it is apt to impart a disagreeable flavor to the brewed beverage. The pipe often is considered objectionable from a hygenic standpoint.

In lieu of such a pipe, as used in the conventional percolators, I employ an upright plate having a shallow groove or channel impressed in it. This groove may be easily inspected and cleaned when the upright plate is removed from the main receptacle of the percolator. When the upright plate is held against the wall of the percolator main receptacle, a portion of the wall will form a cover for the groove. This provides a tubular space through which water may be made to circulate in the same manner that it circulates through the central pipe of the conventional percolator. The upright plate is preferably formed integrally with the base plate of the percolator, and is in effect an extension of the base plate. Thus both plates may be removed from the main receptacle of the percolator as a unit, and all surfaces thereof are exposed for washing purposes.

It is further proposed in this invention to provide means for delivering hot water from the main receptacle of the percolator to the inner receptacle containing the coffee, this water being delivered at less than boiling temperature. Thus the desired oils of the coffee will not be volatilized and lost.

Another object resides in the provision of a base plate of such construction that it will cause the heated water at the bottom of the main receptacle to flow upwardly through the groove in the upright plate prior to actual boiling of the water. This heated water is discharged over the coffee contained in the inner receptacle.

A still further object is to provide novel means for holding the base and upright plates in proper positions relative to the main receptacle of the percolator, and yet permit the ready removal of these plates as a unit.

Another object of this invention is to facilitate the cheap manufacture of a seamless percolator, as will be seen to be practicable from the annexed drawings.

Other objects and advantages will appear as the specification continues, and the novel features of my invention particularly will be set forth in the appended claims.

For a better understanding of the invention, reference should be had to the accompanying drawing, forming part of this application in which:

Figure 1 is a vertical section taken through a coffee percolator constructed in accordance with my invention;

Figure 2 is a top plan view thereof with parts broken away to disclose the interior construction;

Figure 3 is a rear elevational view of the water conveyor that I employ;

Figure 4 is a top plan view of the water conveyor; and

Figure 5 is a vertical section taken along the line V—V of Figure 2.

While I have shown only the preferred form of my invention, it should be understood that various changes, or modifications, may be made within the scope of the annexed claims without departing from the spirit thereof.

In carrying my invention into practice, I provide a main receptacle or pot A, which is formed with a pouring spout 1 and has a suitable handle 2 secured thereto. The upper part of this main receptacle is fashioned with a substantially annular shoulder 3, and an inwardly-extending flange 4 is arranged above this shoulder. An inner percolating receptacle B is disposed in the upper part of the receptacle A and has outwardly-projecting lips 5 thereon that rest upon the shoulder 3 (see Figures 2 and 5).

The inner receptacle B, which is perforated at 6, is adapted for holding the coffee 7 from which the flavor is to be extracted. In Figures 2 and 5, I disclose this receptacle as having vertical wall portions 8 that bear against the inner surface 9 of the main receptacle A. This arrangement prevents lateral shifting of the receptacle B relative to the main receptacle A. It will be noted that the front wall 10 of the inner receptacle is spaced from the wall portion 9a of the main receptacle to provide a pasageway 11 leading to the pouring spout 1.

A lid or cover C is fashioned with diametrically opposite projections 12, which engage underneath the flange 4 for securing the lid in place over the inner receptacle B. In Figure 2, I have illustrated a notch 13, which is formed in the flange 4 in diametrically-opposed relation with respect to the spout 1. In assembling the lid or cover C upon the main receptacle A, the projections 12 are aligned with the spout 1 and the notch 13. Thereafter, the lid is pressed downwardly until the projections 12 are disposed below the annular flange 4. The lid C now is turned and the projections 12 will engage under the flange 4, thus removably retaining the lid in place.

In order to transfer hot water from the lower part of the main receptacle A to the inner percolating receptacle B, I have provided a water conveyor, indicated generally at D. The latter includes a base plate 14 and an upright plate 15. The base plate has a concave under surface 16 and the marginal edge 17 of this base plate rests upon the bottom 18 of the main receptacle and bears against the front wall portion of the latter. The water 19 in the receptacle A may enter the space beneath the base plate 14 through openings 20. These openings may be omitted, if desired, since the water will flow under the marginal edge 17 and gain access to the space 21 formed beneath the base plate.

As previously mentioned, the upright plate 15 has a shallow groove or channel 22 impressed therein. When the water conveyor D is positioned within the main receptacle A, the wall portion 9b of the latter forms a cover for the groove. This provides a vertical tubular space or passageway 23, which communicates with an outlet 24 leading from the space 21. The base and upright plates have been disclosed as being formed integrally with each other. Therefore, the base plate 14 will aid in holding the upright plate 15 in contact with the wall portion 9b of the main receptacle.

In order to permit the heated water 19 to first enter the tubular space or passageway 23 from the space 21 beneath the base plate, I have placed the outlet opening 24 of the base plate at its outer edge 25 and have raised this edge somewhat in this position. I have given the base plate a gently sloping, vaulted, or tiltedly-concaved shape, with the highest portion of the vault at its edge 25 and adjacent to the outlet opening 24. As the water is heated in the space 21, due to the bottom 18 of the main receptacle being exposed to a source of heat (not shown), the heated water will be guided by the concave under surface 16, and will flow through the outlet 25 and enter the vertical space or passageway 23.

The heated water in the passageway 23 will be discharged periodically over the upper end 26 of the upright plate 15, as suggested by the arrows 27, and will spread itself over the coffee 7 contained in the inner receptacle B. The underneath surface 28 of the lid or cover C is suitably designed to cause the water to spread over the coffee 7. The rim 28a of the lid extends beyond the tubular passageway 23 (see Figure 1) so that the curved surface 28 will deflect hot water toward the inner receptacle B. The front portion 28b of the underneath curvature of the lid C registers with the front wall 10 of the inner receptacle.

The spaces 21 and 23 are so dimensioned that the water will be discharged into the inner receptacle B at less than boiling temperature. The temperature of the water thus delivered should be within the range of 200°–205° Fahrenheit. Boiling water (212° Fahrenheit) will volatilize and free desired oils, which will be lost. The skin tension of the water in the space or passageway 23 is so strong that steam bubbles cannot escape without forcing the water upwardly. Thus the pressure in the space or passageway 23 is built up until it will overcome the skin tension. At this point, the column of water in the space or passageway 23 will spout upwardly and discharge into the inner receptacle B. Thus delivery of heated water to the coffee 7 is periodical.

It will be noted that the upright plate 15 is provided with wings 29, which are arranged on opposite sides of the groove or channel 22. These wings are curved in top plan view (see Figures 2 and 4) so as to conform to the inner surface 9 of the main receptacle. A plurality of grooves 30a, 30b, 30c and 30d are formed in each of these wings and extend throughout the height of the latter. Of course, these grooves are filled with water to the level 19a in the main receptacle A. Any hot water tending to escape laterally from the groove or channel 22 initially will be trapped in the grooves 30a, wherein a turbulent action will be set up with the water already in these grooves, acting to impede further flow of the hot water toward the grooves 30b. In the event that water should escape to the grooves 30b, the turbulence created in the latter grooves will act to impede flow of this water to the grooves 30c. The grooves 30c and 30d function in the same manner, to the end that no water will escape at the side edges 31 of the upright plate. Figure 3 clearly shows the grooves 22, 30a, 30b, 30c and 30d as being parallel with respect to one another.

Figure 2 shows the lips 5 of the inner receptacle B contacting with the side edges 31 of the upright plate 15 so as to hold the top of the latter in engagement with the inner surface 9 of the main receptacle A. The inner receptacle B also is fashioned with a curved wall portion 32 that engages with a rib 33, the latter being formed on the upright plate due to the groove channel 22 being impressed therein. This curved portion 32 serves to retain the upright plate against the inner surface 9 of the main receptacle. The wings 29 also are reinforced due to the formation of vertical ribs opposite each of the grooves 30a to 30d, inclusive.

In the preferred construction of this device, I employ sheet metal, such as aluminum or stainless steel, for the inner parts; namely, the base plate 14 with its accompanying extension 15, and the inner percolating or steeping receptacle B. These parts may be shaped by means of dies. The main receptacle A of the percolator preferably is made of similar sheet metal, shaped up by spinning or drawing and stamping with dies, but it may be made of glass, in which case it is intended to be produced from a mold. The lid C may be made of glass and produced from a mold.

Having thus described the various parts of my percolator, the operation thereof may be readily understood. In operating this device, the base plate 14 is placed in position on the bottom 18 of the main receptacle A with its upright plate 15 lying against the inner wall of the main receptacle, preferably against the portion 9b diametrically opposite to the pouring spout 1.

The inner receptacle B now is inserted until its lips 5 rest upon the shoulder 3 (see Figure 5) and the curved wall portion 32 of the inner receptacle bears against the rib 33 of the upright plate. At this time, the side edges 31 of the upright plate also will be held in place by the lips 5. Thus the top of the upright plate is firmly held against the inner surface of the main receptacle. The front portion of the marginal edge 17 rests against the front wall of the main receptacle. Next, the lid or cover C is introduced into position and the projections 12 are engaged under the flange 4.

The parts being thus arranged, the groove or channel 22 in the upright plate 15 becomes in effect a tube, communicating with the space 21 beneath the base plate 14. Upon heating the bottom 18 of the main receptacle, hot water will be forced periodically upwardly through the space or passageway 23 and discharged over the coffee contained in the inner receptacle B.

The water delivered over the coffee 7 will have a temperature within the approximate range of 200°–205° Fahrenheit, and will drain out of the perforations 6, which are formed in the inner receptacle. Recirculation of the water should be continued until the brewed coffee has the desired strength.

When the lid C, inner receptacle B and the water conveyor D are removed from the main receptacle A, all surfaces of these parts and the main receptacle are exposed for easy washing and cleaning.

I claim:

1. In a coffee percolator, a main receptacle, a base plate resting on the bottom of the main receptacle and having a concaved under surface coacting with the main receptacle in forming a water-heating space, an upright plate extending from the base plate and having a groove fashioned therein communicating with the water-heating space, the upright plate being disposed to bear against the inner wall of the main receptacle so that a portion of the latter will form a cover over the groove and provide a tubular passageway extending upwardly from the water-heating space to a point of discharge, and an inner coffee-holding receptacle arranged to receive hot water discharging from the tubular passageway when water is heated in the space beneath the base plate, the base and upright plates being removable from the main receptacle whereby all surfaces of these plates may be inspected and cleaned, the upright plate having wings thereon shaped to bear against the inner surface of the main receptacle, the wings having vertically-extending grooves fashioned in the face thereof which bears against the inner surface of the main receptacle and designed to impede lateral flow of water from the tubular passageway.

2. In a coffee percolator, a main receptacle, a base plate resting on the bottom of the main receptacle and having a concaved under surface coacting with the main receptacle in forming a water-heating space, said base plate having an upright plate extending therefrom and having a groove fashioned therein for communicating with the water-heating space, the upright plate having wing portions arranged along each side of the groove for contacting the inner wall of the main receptacle for preventing lateral movement of any liquid that moves upwardly in the passageway formed by the groove and the adjacent wall portion of the receptacle, an inner coffee-holding receptacle removably carried by the main receptacle and abutting the upright plate and having an open top arranged to receive water discharged from the passageway when water is heated in the space beneath the base plate, and a cover for the main receptacle and having a curved under surface for guiding water from the passageway into the top of the coffee-holding receptacle, said base plate and upright plate being removable as a unit from the main receptacle, whereby all surfaces of these plates may be inspected and cleaned.

DONALD E. DUNLOP.

REFERENCES CITED

The following references are of record in the file of this patent:

UNITED STATES PATENTS

| Number | Name | Date |
| --- | --- | --- |
| 203,275 | Hunt | May 7, 1878 |
| 412,138 | Terrell | Oct. 1, 1889 |
| 630,761 | Wilmot | Aug. 8, 1899 |
| 1,276,774 | Kuhn et al. | Aug. 27, 1918 |
| 2,334,752 | Clapp et al. | Nov. 23, 1943 |